US012621199B2

(12) United States Patent
Elshafie et al.

(10) Patent No.: US 12,621,199 B2
(45) Date of Patent: May 5, 2026

(54) TECHNIQUES FOR GENERATING WAVEFORMS FOR FULL DUPLEX WIRELESS COMMUNICATIONS

(71) Applicant: QUALCOMM Incorporated, San Diego, CA (US)

(72) Inventors: Ahmed Elshafie, San Diego, CA (US); Muhammad Sayed Khairy Abdelghaffar, San Jose, CA (US); Ahmed Attia Abotabl, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 18/071,286

(22) Filed: Nov. 29, 2022

(65) Prior Publication Data

US 2024/0179041 A1 May 30, 2024

(51) Int. Cl.
| | |
|---|---|
| *H04W 4/00* | (2018.01) |
| *H04L 1/00* | (2006.01) |
| *H04L 27/26* | (2006.01) |
| *H04W 72/21* | (2023.01) |
| *H04W 72/23* | (2023.01) |

(52) U.S. Cl.
CPC ........ *H04L 27/2636* (2013.01); *H04L 1/0068* (2013.01); *H04L 27/2613* (2013.01); *H04W 72/21* (2023.01); *H04W 72/23* (2023.01)

(58) Field of Classification Search
None
See application file for complete search history.

(56) References Cited

U.S. PATENT DOCUMENTS

| | | | |
|---|---|---|---|
| 11,621,817 B2 * | 4/2023 | Bala ................... | H04L 27/2636 |
| | | | 370/329 |
| 2011/0235684 A1 * | 9/2011 | Dahlman .......... | H04W 72/0453 |
| | | | 375/135 |
| 2014/0328375 A1 * | 11/2014 | Dahlman ............... | H04B 1/713 |
| | | | 375/133 |
| 2014/0376485 A1 * | 12/2014 | Lee ....................... | H04L 5/0053 |
| | | | 370/329 |
| 2015/0358924 A1 * | 12/2015 | Papasakellariou .. | H04W 52/346 |
| | | | 370/329 |
| 2018/0048347 A1 * | 2/2018 | Kim .................... | H04L 25/0202 |
| 2019/0173546 A1 * | 6/2019 | Kim .................. | H04W 72/0446 |
| 2019/0222455 A1 * | 7/2019 | Sahin .................... | H04L 1/0069 |
| 2019/0380124 A1 * | 12/2019 | Kim ...................... | H04W 72/21 |
| 2020/0021410 A1 * | 1/2020 | Choi ..................... | H04L 5/0044 |
| 2020/0235979 A1 * | 7/2020 | Yokomakura ......... | H04W 88/02 |
| 2020/0244503 A1 * | 7/2020 | Bala ................... | H04L 27/2636 |

* cited by examiner

*Primary Examiner* — Bob A Phunkulh
(74) *Attorney, Agent, or Firm* — ArentFox Schiff, LLP

(57) ABSTRACT

Aspects described herein relate to modifying data for input to a discrete Fourier transform (DFT) so a set of resource elements (REs) output from the DFT for transmission in a communication direction includes one or more punctured REs corresponding to reference signals received in a different communication direction, performing the DFT for the data to generate the set of REs, mapping at least a portion of the set of REs to one or more symbols to generate a signal, and transmitting the signal in the communication direction. Other aspects relate to receiving the signal and decoding the data.

30 Claims, 11 Drawing Sheets

500

Reduce an input size of the DFT based on a number of the one or more punctured REs — 526

Modify data for input to a DFT so a set of REs output from the DFT for transmission in a communication direction includes one or more punctured REs corresponding to reference signals received in a different communication direction — 502
Reduce a size of the data to be less than a size indicated for input to the DFT — 514
Pad a number of zeros between samples as input to the DFT to generate the one or more punctured REs — 516
Reduce a size of the data to be a size indicated for input to the DFT divided by a number of the one or more punctured REs — 522
Reduce a size of the data to be the input size of the DFT as reduced — 528

Perform the DFT for the data to generate the set of REs — 504
Input multiple repetitions of the data of the reduced size to the DFT — 524

Map at least a portion of the set of REs to one or more symbols to generate a signal — 506
Map a number of REs equal to a size of the input to the DFT divided by the number of zeros — 518
Map multiple repetitions of the set of REs to the one or more symbols — 520

Transmit the signal in the communication direction — 508
Receiving, while transmitting the signal in the communication direction, the reference signals in the different communication direction — 510
Perform, based on the reference signals, channel estimation of a channel received in the non-punctured REs — 512

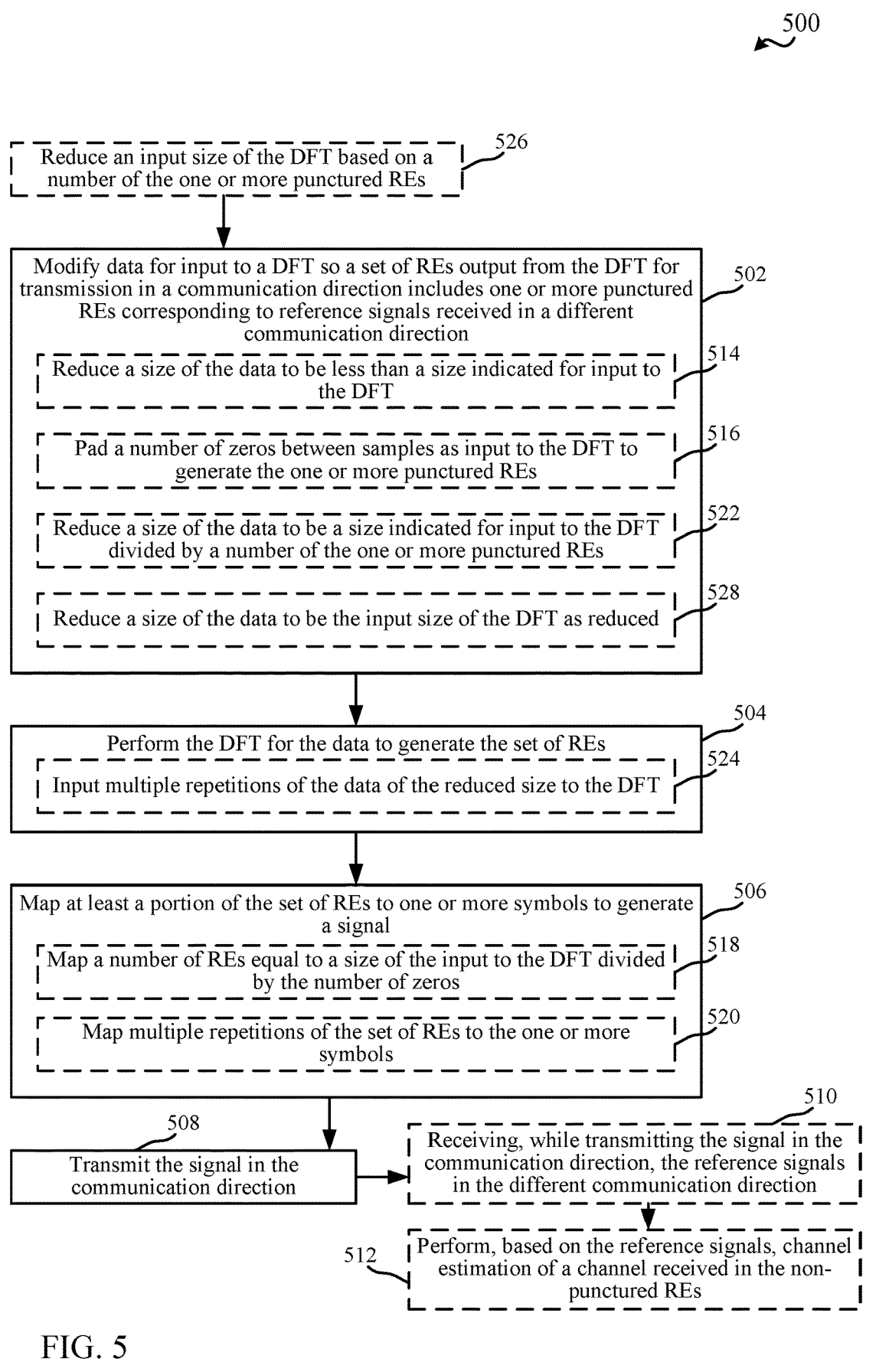

500

Reduce an input size of the DFT based on a number of the one or more punctured REs — 526

Modify data for input to a DFT so a set of REs output from the DFT for transmission in a communication direction includes one or more punctured REs corresponding to reference signals received in a different communication direction — 502

Reduce a size of the data to be less than a size indicated for input to the DFT — 514

Pad a number of zeros between samples as input to the DFT to generate the one or more punctured REs — 516

Reduce a size of the data to be a size indicated for input to the DFT divided by a number of the one or more punctured REs — 522

Reduce a size of the data to be the input size of the DFT as reduced — 528

Perform the DFT for the data to generate the set of REs — 504

Input multiple repetitions of the data of the reduced size to the DFT — 524

Map at least a portion of the set of REs to one or more symbols to generate a signal — 506

Map a number of REs equal to a size of the input to the DFT divided by the number of zeros — 518

Map multiple repetitions of the set of REs to the one or more symbols — 520

510

Transmit the signal in the communication direction — 508

Receiving, while transmitting the signal in the communication direction, the reference signals in the different communication direction Perform, based on the reference signals, channel estimation of a channel received in the non-punctured REs — 512

FIG. 5

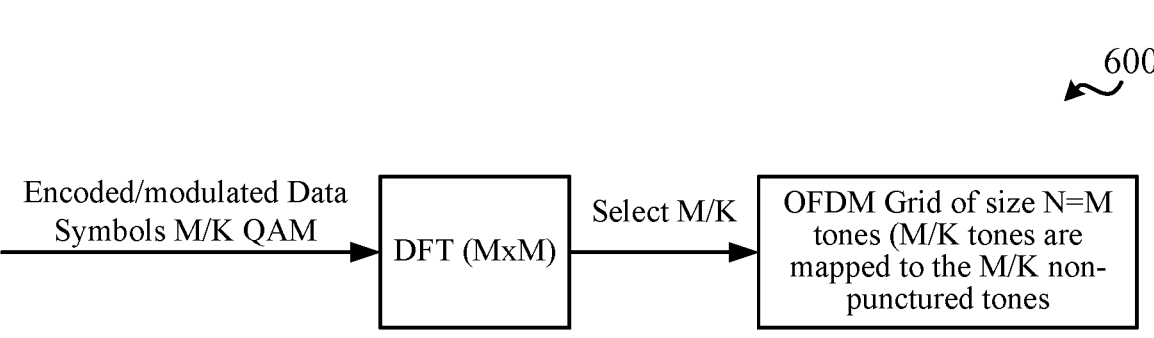
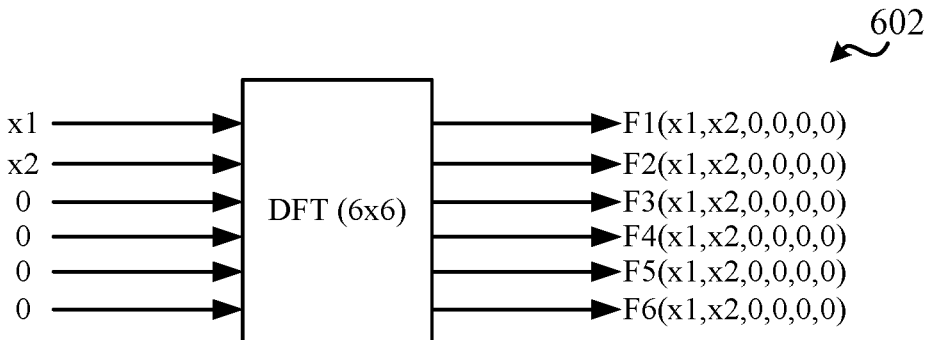
FIG. 6

1000

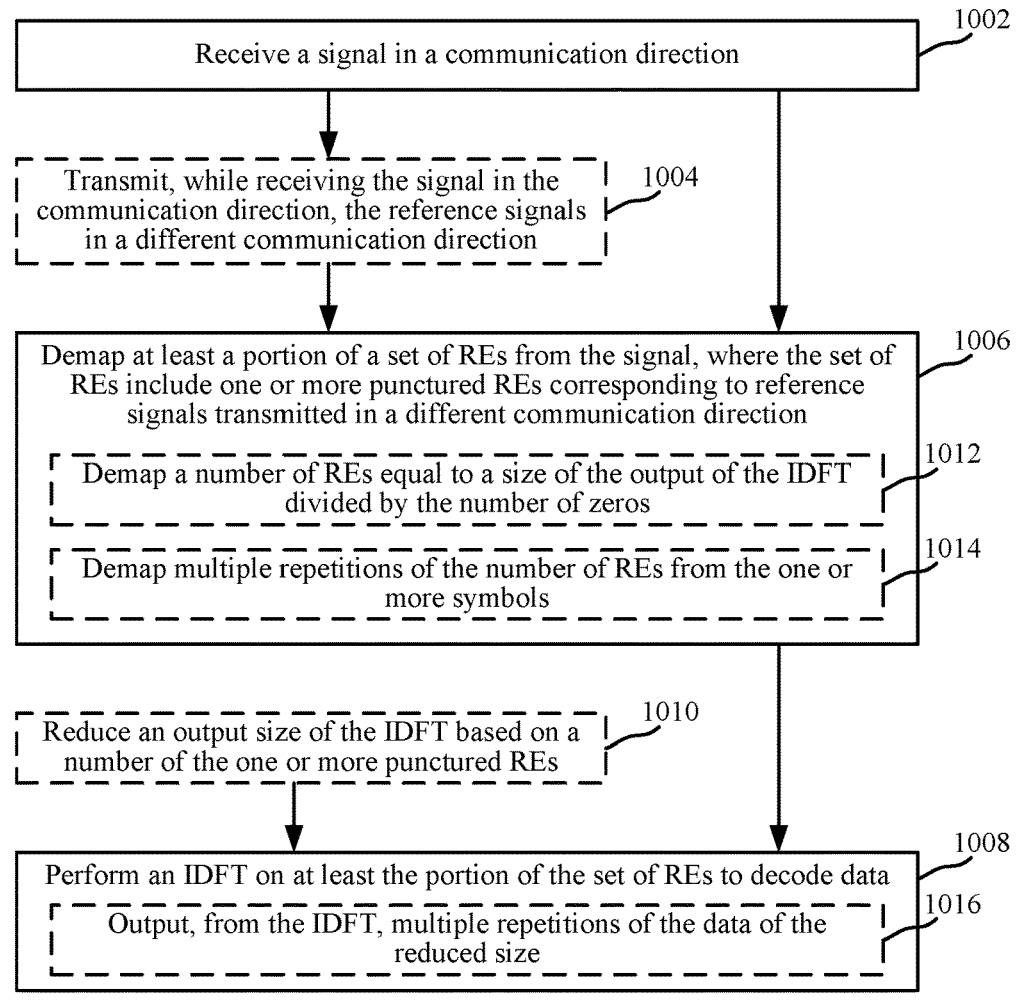

Receive a signal in a communication direction                                    1002

Transmit, while receiving the signal in the
communication direction, the reference signals          1004
in a different communication direction Demap at least a portion of a set of REs from the signal, where the set of        1006
REs include one or more punctured REs corresponding to reference
signals transmitted in a different communication direction Demap a number of REs equal to a size of the output of the IDFT       1012
divided by the number of zeros Demap multiple repetitions of the number of REs from the one or       1014
more symbols Reduce an output size of the IDFT based on a        1010
number of the one or more punctured REs Perform an IDFT on at least the portion of the set of REs to decode data        1008

Output, from the IDFT, multiple repetitions of the data of the       1016
reduced size

FIG. 10

TECHNIQUES FOR GENERATING WAVEFORMS FOR FULL DUPLEX WIRELESS COMMUNICATIONS

FIELD OF THE DISCLOSURE

Aspects of the present disclosure relate generally to wireless communication systems, and more particularly, to techniques for full duplex (FD) wireless communications.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, devices and/or node can use full-duplex (FD) operations to transmit and receive signals in a same time period, where the FD operations may be inter-subband where transmission and reception can occur in different subbands, or intra-subband where transmission and reception can occur in the same subband (or full frequency band).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to modify data for input to a discrete Fourier transform (DFT) so a set of resource elements (REs) output from the DFT for transmission in a communication direction includes one or more punctured REs corresponding to reference signals received in a different communication direction, perform the DFT for the data to generate the set of RES, map at least a portion of the set of REs to one or more symbols to generate a signal, and transmit the signal in the communication direction.

According to an aspect, an apparatus for wireless communication is provided that includes a processor, memory coupled with the processor, and instructions stored in the memory. The instructions are operable, when executed by the processor, to cause the apparatus to receive a signal in a communication direction, demap at least a portion of a set of REs from the signal, wherein the set of REs include one or more punctured REs corresponding to reference signals transmitted in a different communication direction, and perform an IDFT on at least the portion of the set of REs to generate data.

In another aspect, a method for wireless communication by a full duplex device is provided that includes modifying data for input to a DFT so a set of REs output from the DFT for transmission in a communication direction includes one or more punctured REs corresponding to reference signals received in a different communication direction, performing the DFT for the data to generate the set of REs, mapping at least a portion of the set of REs to one or more symbols to generate a signal, and transmitting the signal in the communication direction.

In another aspect, a method for wireless communication by a full duplex device is provided that includes receiving a signal in a communication direction, demapping at least a portion of a set of REs from the signal, wherein the set of REs include one or more punctured REs corresponding to reference signals transmitted in a different communication direction, and performing an IDFT on at least the portion of the set of REs to generate data.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 5 is a flow chart illustrating an example of a method for generating a signal for transmission in a communication direction, where the signal has one or more resource elements (REs) punctured for receiving reference signals in a different communication direction, in accordance with aspects described herein;

FIG. 6 illustrates examples of performing a discrete Fourier transform (DFT) of a first size using reduced size data, in accordance with aspects described herein;

FIG. 10 is a flow chart illustrating an example of a method for decoding data from a signal having one or more REs punctured for receiving reference signals, in accordance with aspects described herein.

DETAILED DESCRIPTION

Figure 1:
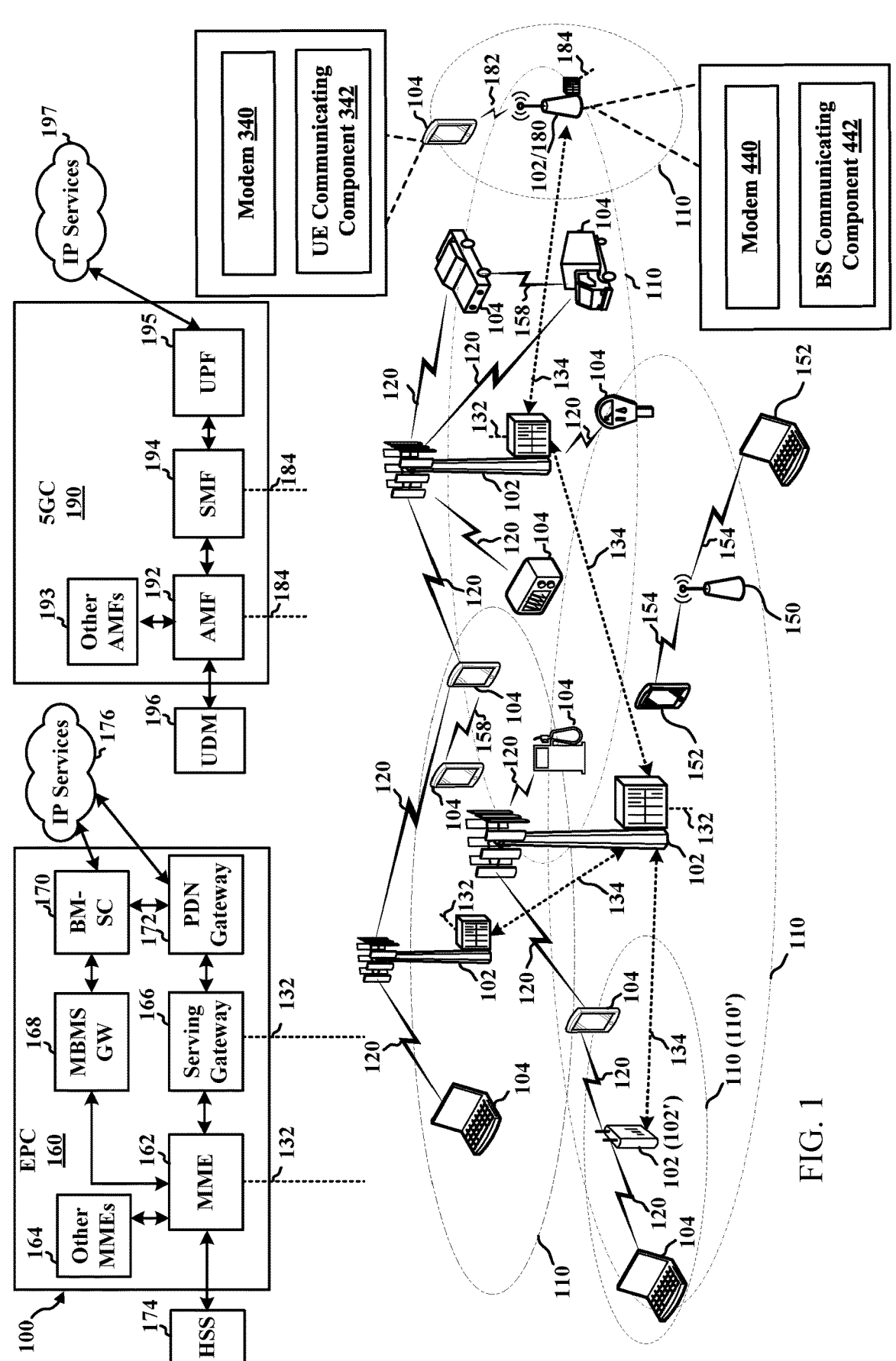
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to generating waveforms having punctured resource elements (REs) to enable full duplex (FD) wireless communications. For example, devices in some wireless communication technologies, such as fifth generation (5G) new radio (NR), can communicate using subband non-overlapping FD, where uplink and downlink communications can be on different subbands of an operating frequency, and/or dynamic/flexible time division duplexing (TDD), where uplink and downlink communications may use the same operating frequency band. In FD configurations, devices can concurrently transmit and receive signals in the same slot. For example, a slot can include a time period of multiple symbols (e.g., orthogonal frequency division multiplexing (OFDM) symbols, single carrier-frequency division multiplexing (SC-FDM) symbols, etc.). Using FD in the same slot can allow for an increased uplink duty cycle (e.g., as compared to TDD communications), which can reduce latency (e.g., by making it possible to receive downlink signals in uplink slots), improve coverage, enhance system capacity, enhance resource utilization, enhance spectrum efficiency, enable flexible and dynamic uplink/downlink resource adaptation according to uplink/downlink traffic in a robust manner, etc.

For example, 5G wireless networks may provide ultrahigh data rate and support wide scope of application scenarios. Wireless FD communications can increase the link capacity by enabling radio network nodes to transmit and receive simultaneously on the same frequency band and at the same time slot, which contrasts with conventional half duplex operation where transmission and reception either differ in time or in frequency. In an example, a full-duplex network node, such as a base station in the cellular network, can simultaneously communicate in uplink (UL) and downlink (DL) with two half-duplex terminals using the same radio resources. Another example of a wireless full duplex application scenario can include one relay node simultaneously communicating with an anchor node and a mobile terminal in a one-hop scenario, or with the other two relay nodes in a multi-hop scenario. It is expected that by doubling each single-link capacity, full duplexing can significantly increase the system throughput in diverse applications in wireless communication networks, and also reduce the transfer latency for time critical services.

In using FD communications, however, the devices (e.g., user equipment (UEs), and/or network nodes with which the UEs communicate, etc.) can experience self-interference. One key to enabling full-duplex transmissions can be the capability of cancelling strong self-interference from downlink to uplink. Current full-duplex radio designs can suppress up to 110 decibels (dB) of such self-interference by combining the technologies of beamforming, analog cancellation, digital cancellation and antenna cancellation. Similar interference can be experienced among UEs located near one another (UE-to-UE, or inter-UE, interference). For example, as the DL UE and UL UE (or backhaul link and access link at the UE) can employ the same time-frequency resource, if these two UEs (or two nodes) locate in short distance, the UL transmission signal may cause serious co-channel interference to the DL signal reception.

Aspects described herein relate to avoiding the self-interference of devices toward resources used for reference signals (RSs). For example, self-interference or inter-UE interference can be avoided toward demodulation reference signals (DMRSs) used for physical downlink shared channel (PDSCH) and/or physical uplink shared channel (PUSCH). This can improve channel estimation performance based on the DMRS and hence improve the signal reception performance and data throughputs in both DL and UL, or both backhaul link and access link. In one example, a waveform can be designed and utilized for puncturing DMRS with data in FD context. The waveform can include one or more of a cyclic prefix (CP)-orthogonal frequency division multiplexing (OFDM) waveform, a discrete Fourier transform (DFT)-spread(s)-OFDM waveform, and/or the like. Generating the waveform to include punctured resource elements (REs) for RSs, such as DMRS, can improve hearability of the RSs at the FD device when transmitting communications that use the waveform.

The described features will be presented in more detail below with reference to FIGS. 1-11.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for generating a waveform for uplink transmission with punctured tones for receiving downlink RSs, in accordance with aspects described herein. In addition, some nodes may have a modem 440 and BS communicating component 442 for processing an uplink waveform having punctured tones, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an SI interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IOT (also referred to as CAT NB1) UEs, as well as other types of UEs. In the present disclosure, eMTC and NB-IOT may refer to future technologies that may evolve from or may be based on these technologies. For example, eMTC may include FeMTC (further eMTC), eFeMTC (enhanced further eMTC), mMTC (massive MTC), etc., and NB-IOT may include eNB-IoT (enhanced NB-IOT), FeNB-IOT (further enhanced NB-IOT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can generate a waveform for transmitting UL signals where the waveform can have REs punctured at locations of downlink RSs, which can enable receiving of the downlink RSs while transmitting the UL signals by a full duplex UE 104. UE communicating component 342 can perform functions before a DFT so that the corresponding waveform has the punctured REs. For example, UE communicating component 342 can modify data that is input into the DFT, which can include reducing a size of the data input into the DFT, padding zeros in samples input into the DFT, or can modify an input size of the DFT, etc. to effectuate the punctured REs. In an example, UE communicating component 342 can map a portion of REs from the DFT to one or more symbols to generate the signal with the punctured REs. In an example, BS communicating component 442 can receive the signal, demap at least a portion of the REs (e.g., the non-punctured REs) and can perform an inverse DFT (IDFT) to obtain the modified data.

Figure 2:
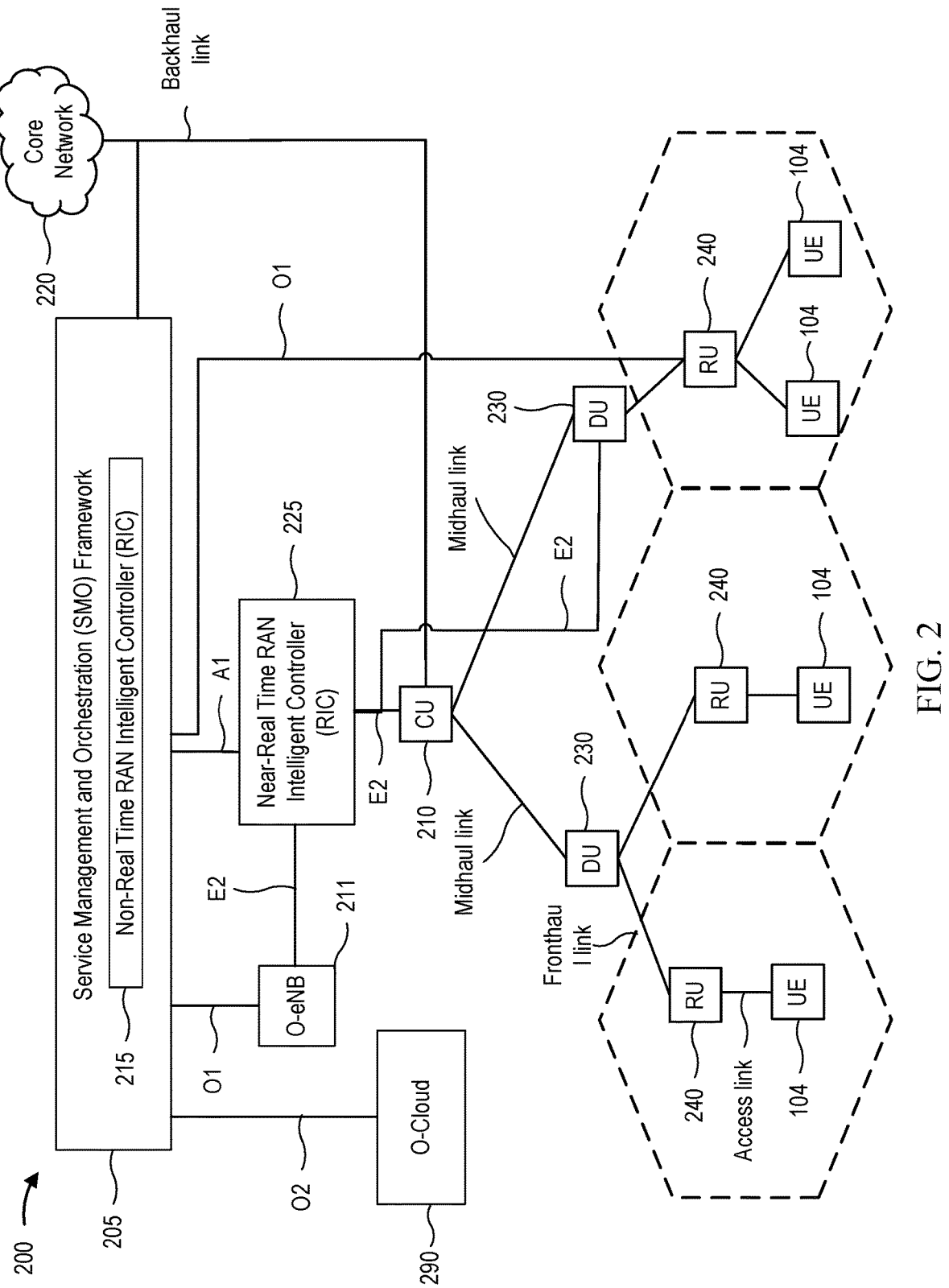
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUS) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUS 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Turning now to FIGS. 3-11, aspects are depicted with reference to one or more components and one or more methods that may perform the actions or operations described herein, where aspects in dashed line may be optional. Although the operations described below in FIGS. 5 and 10 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
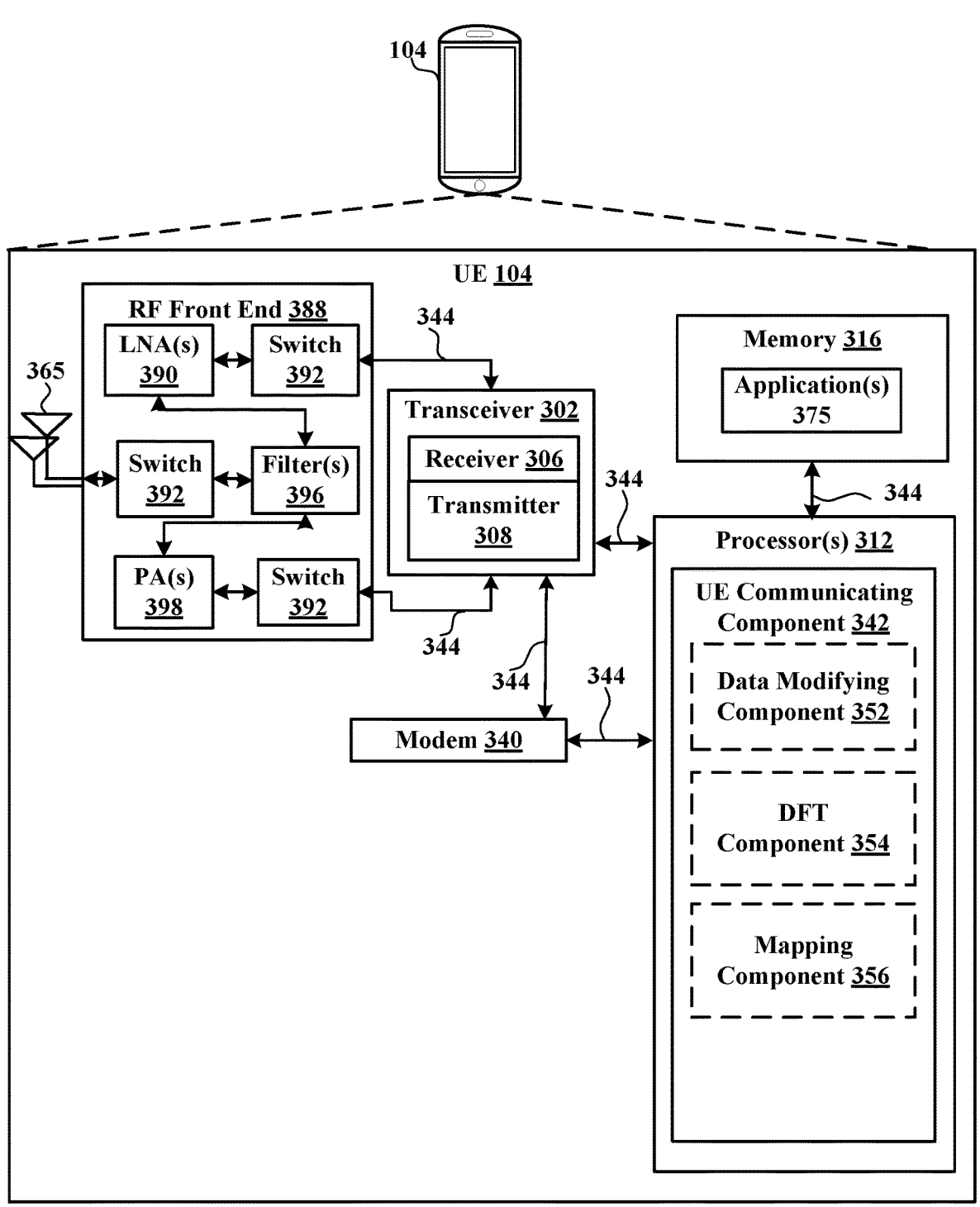
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for generating a waveform for uplink transmission with punctured tones for receiving downlink RSs, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAS) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a data modifying component 352 for modifying data for input into a DFT to generate one or more punctured REs in a corresponding waveform, a DFT component 354 for performing the DFT on the input data, and/or a mapping component 356 for mapping DFT output to one or more OFDM symbols to generate the waveform (or signal), in accordance with aspects described herein. As described above, in one example, a base station 102 may additionally or alternatively include the UE communicating component 342 for generating punctured waveforms for downlink signals (e.g., having puncture REs in locations indicated for uplink RSs to receive the uplink RSs while transmitting the downlink signals).

In an aspect, the processor(s) 312 may correspond to one or more of the processors described in connection with the UE in FIG. 11. Similarly, the memory 316 may correspond to the memory described in connection with the UE in FIG. 11.

Figure 4:
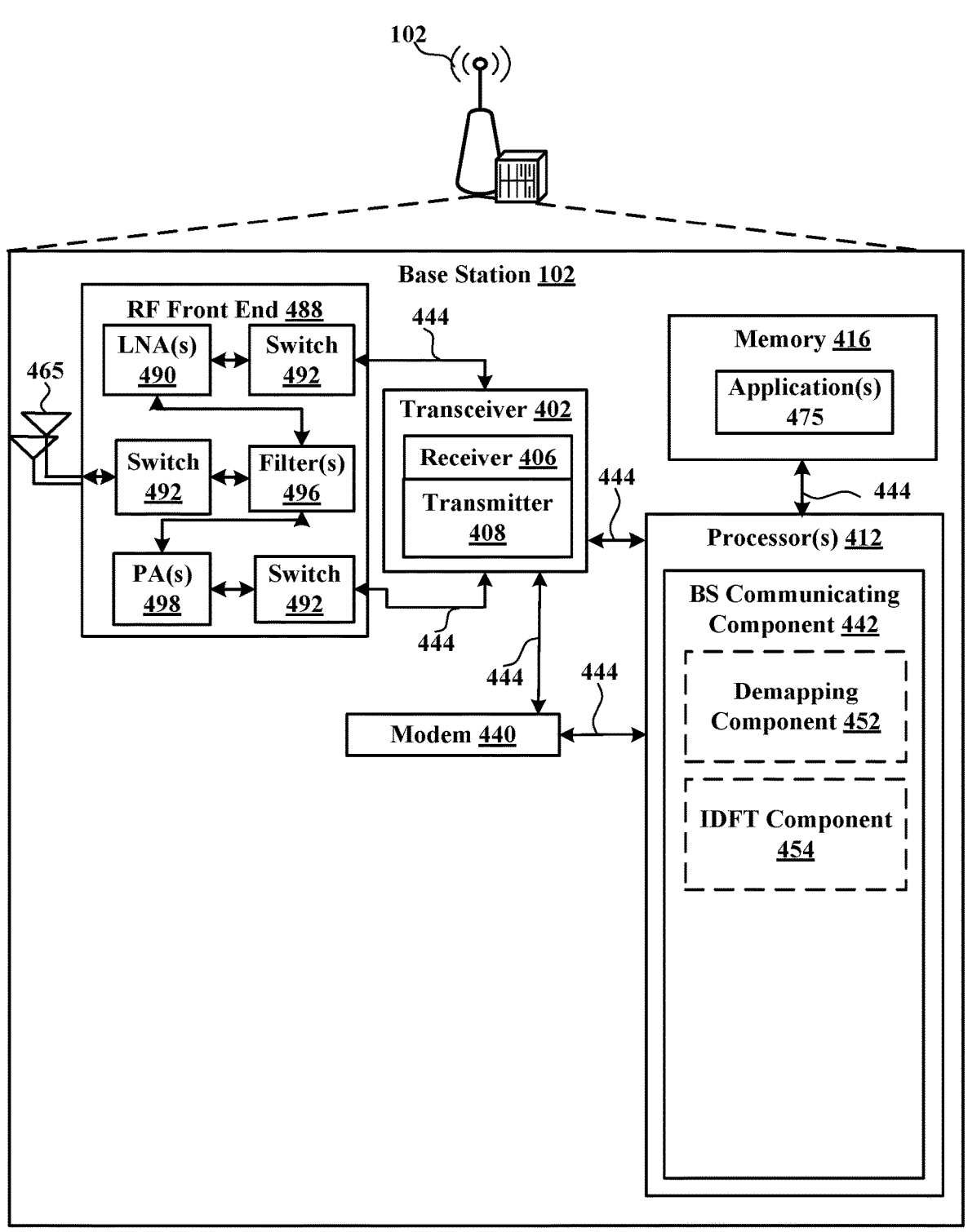
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for processing an uplink waveform having punctured tones, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a demapping component 452 for demapping REs from a received waveform (or signal), and/or a IDFT component 454 for performing a IDFT on the demapped REs to obtain data from the signal, in accordance with aspects described herein. As described above, in one example, a UE 104 may additionally or alternatively include the BS communicating component 442 for processing punctured waveforms transmitted in downlink signals by a base station 102.

In an aspect, the processor(s) 412 may correspond to one or more of the processors described in connection with the base station in FIG. 11. Similarly, the memory 416 may correspond to the memory described in connection with the base station in FIG. 11.

FIG. 5 illustrates a flow chart of an example of a method 500 for generating a signal for transmission in a communication direction, where the signal has one or more REs punctured for receiving reference signals in a different communication direction, in accordance with aspects described herein. In an example, a UE 104 or base station 102 can perform the functions described in method 500 using one or more of the components described in FIGS. 1 and 3.

In method 500, at Block 502, data for input to a DFT can be modified so a set of REs output from the DFT for transmission in a communication direction includes one or more punctured REs corresponding to reference signals received in a different communication direction. In an aspect, data modifying component 352, e.g., in conjunction with processor(s) 312, memory 316, transceiver 302, UE communicating component 342, etc., can modify data for input to the DFT so the set of REs output from the DFT for transmission in a communication direction (e.g., UL for a UE or DL for a base station) includes one or more punctured REs corresponding to reference signals (e.g., DMRS) received in a different communication direction (e.g., DL for the UE or UL for the base station). For example, where a UE 104 is generating the waveform, data modifying component 352 of the UE 104 can modify the data for uplink transmission to have punctured REs in resource locations of DL DMRS, which can allow the UE 104 operating in full duplex to receive the DL DMRS while transmitting the UL data. In this example, the communication direction can be uplink and the different communicating direction can be downlink. In another example, where a base station 102 is generating the waveform, data modifying component 352 of the base station 102 can modify the data for downlink transmission to have punctured REs in resource locations UL DL DMRS, which can allow the base station 102 operating in full duplex to receive the UL DMRS while transmitting the DL data. In this example, the communication direction can be downlink and the different communicating direction can be uplink.

In one example, data modifying component 352 can obtain information regarding the REs corresponding to the reference signals. For example, the REs may be defined in a wireless communication technology (e.g., 5G NR) as used for reference signals, or UE communicating component 342 may receive a configuration indicating the REs used for reference signals in the different communication direction, and/or the like. Data modifying component 352 can puncture the REs based on this information so the punctured REs align with those used by another node for transmitting reference signals.

In method 500, at Block 504, the DFT can be performed for the data to generating the set of REs. In an aspect, DFT component 354, e.g., in conjunction with processor(s) 312, memory 316, transceiver 302, UE communicating component 342, etc., can perform the DFT on the data, as modified by the data modifying component 352, to generate the set of REs. In one example, the set of REs can include the punctured REs and one or more non-punctured REs that carry the data. In another example, the set of REs may include only the non-punctured REs, and the mapping component 356 can map the non-punctured REs with punctured REs to generate the waveform with punctured REs.

In method 500, at Block 506, at least a portion of the set of REs can be mapped to one or more symbols to generate a signal. In an aspect, mapping component 356, e.g., in conjunction with processor(s) 312, memory 316, transceiver 302, UE communicating component 342, etc., can map at least the portion of the set of REs to the one or more symbols to generate the signal. For example, mapping component 356 can map the REs output from the DFT, where the output include the punctured REs, to the one or more symbols (e.g., OFDM symbols) to generate the signal with the punctured REs. In another example, as described, mapping component 356 can map the non-punctured REs output from the DFT with the punctured REs to generate the signal.

In method 500, at Block 508, the signal can be transmitted in the communication direction. In an aspect, UE communicating component 342, e.g., in conjunction with processor(s) 312, memory 316, transceiver 302, etc., can transmit the signal in the communication direction. UE communicating component 342 can transmit the signal with the punctured REs to allow the UE 104 to receive reference signals in the punctured REs when operating in full duplex mode. For example, UE communicating component 342 of a UE can transmit the signal in the UL communication direction, as described.

In method 500, optionally at Block 510, the reference signals can be received in the difference communication direction while transmitting the signal in the communication direction. In an aspect, UE communicating component 342, e.g., in conjunction with processor(s) 312, memory 316, transceiver 302, etc., can receive, while transmitting the signal in the communication direction, the reference signals in the different communication direction. For example, a UE 104 operating in full duplex mode can transmit the uplink signal while receiving downlink reference signals in the punctured REs, as described above. In this example, the reference signals can be received in the punctured REs, which can be free from self-interference by the transmitted signal.

In method 500, optionally at Block 512, channel estimation of a channel received in the non-punctured REs the reference signals can be performed based on the reference signals. In an aspect, UE communicating component 342, e.g., in conjunction with processor(s) 312, memory 316, transceiver 302, etc., can perform, based on the reference signals, channel estimation of the channel received in the non-punctured REs. For example, where the UE 104 is receiving downlink reference signals and generating the waveform to puncture REs for receiving the downlink reference signals, the channel can be a downlink channel (e.g., PDSCH), the reference signals can be downlink DMRS, and UE communicating component 342 can perform channel estimation of the downlink channel for demodulating data from the downlink channel.

Various examples for modifying the data or otherwise effectuating punctured REs in the generated signal are described herein. In one specific example, in 5G NR, a gNB can use CP-OFDM for downlink signals while UE can use either CP-OFDM or DFT-s-OFDM for uplink signals. Where the gNB and UE use CP-OFDM, puncturing in the frequency domain can be used. The idea of puncturing DL DMRS resource elements (REs that collide with data) may include the UE differently generating the waveform or otherwise nulling data REs on DMRS such that self-interference can be estimated. The DL DMRS can be protected by puncturing corresponding data/DMRS on the UL. In SC OFDM, puncturing in the frequency domain (e.g., after the DFT) may damage the signal, so some aspects descried herein relate to puncturing in the domain of DMRS generation or data generation (e.g., in the time domain). Puncturing a SC OFDM signal after the DFT may damage the signal as each RE can include a combination of the number of symbols, M (e.g., M size of DFT). In an example, to puncture data from DL tones on DMRS tones on UL, the puncturing can be done in frequency domain—to estimate the self-interference which could improve the DL decoding quality (better self-interference detection and/or cancellation). In another example, to puncture DMRS tones from DL on data tones on UL, the puncturing can be done in frequency domain. In another example, to puncture data tones from UL on DMRS/data tones on DL, the UL puncturing can be done in time domain, as UL is SC OFDM.

In an example, the data for input to the DFT can be reduced in size to allow for transmitting the data while puncturing some of the REs in the generated signal. For example, in modifying the data at Block 502, optionally at Block 514, a size of the data can be reduced to be less than a size indicated for input to the DFT. In an aspect, data modifying component 352, e.g., in conjunction with processor(s) 312, memory 316, transceiver 302, UE communicating component 342, etc., can reduce the size of the data to be less than the size indicated for input to the DFT. For example, where the data includes M elements and the input size to the DFT is M, data modifying component 352 can reduce the data size to N<M, such that the DFT generates output of size N, which can be mapped to M REs, such that N REs include data, and M−N REs are punctured. In one specific example, data modifying component 352 can reduce the size of the data to be a size indicated for input to the DFT divided by a number of the one or more punctured REs, as described below.

In one example, the DFT size can be fixed (e.g., set to M) to be a size without puncturing (e.g., an original size), then the signal can be upsampled (e.g., by padding zeros) according to the number of REs to puncture. For example, if a number, K, REs are to be punctured (e.g., for K DMRS in a symbol), then pad K−1 zeros between samples (e.g., between every two samples). Then, M/K can be selected from the DFT output and mapped to the M/K tones or REs (e.g., the signal can be repeated K times). For example, data modifying component 352 can modify the data of size M to be of size K and/or can encode or modulate data symbols using M/K quadrature amplitude modulation (QAM) to achieve the reduced size data for input to the DFT. For example, in modifying the data at Block 502, optionally at Block 516, a number of zeros can be padded between samples as input to the DFT to generate the one or more punctured REs. In an aspect, data modifying component 352, e.g., in conjunction with processor(s) 312, memory 316, transceiver 302, UE communicating component 342, etc., can pad the number of zeros between samples as input to the DFT to generate the one or more punctured REs. For example, the DFT may be of size M, and data modifying component 352 can reduce the size of the data input into the DFT to M/K and/or can pad a number K−1 of zeros in the data to result in generating or being able to generate the punctured REs. In one example, data modifying component 352 can pad K−1 zeros in between data samples, as described further herein. In another example, data modifying component 352 can pad zeros at the end of the reduced size data to achieve size M for the data, and the zeros can then allow for introducing punctured REs, as described further herein.

In addition, in this example, in mapping at least the portion of the set of REs at Block 506, optionally at Block

518, a number of REs equal to a size of the input to the DFT divided by the number of zeros can be mapped. In an aspect, mapping component 356, e.g., in conjunction with processor (s) 312, memory 316, transceiver 302, UE communicating component 342, etc., can map the number of REs equal to the size of the input to the DFT divided by the number of zeros. This can enable a device receiving the waveform to decode the reduced size data. In addition, for example, mapping component 356 can refrain from mapping samples to the remaining REs to puncture the REs, as described above and further herein. An example is shown in FIG. 6.

FIG. 6 illustrates examples of performing a DFT of a first size using reduced size data. In operation 600, encoded/modulated data symbols that are M/K QAM can be input into a DFT of size M×M. M/K samples from the DFT output can be selected and mapped to a OFDM symbol grid of size N M tones. For example, the M/K tones can be mapped to M/K punctured tones, and the remaining tones can be punctured tones for receiving reference signals. In operation 602, in one specific example, the DFT can be 6×6, and the data input to the DFT can be reduced from size 6 to size 2 (including 2 elements and 4 padded zeros). In this example, the DFT can output samples that are functions of the data (x1, x2) and the padded zeros. A mapping component 356 can select any 2 samples for mapping to REs to allow for decoding the data, and can puncture the remaining REs for receiving reference signals. At the receiver side, the receiver (e.g., received node as a network node, base station 102, gNB, portion thereof, etc.) can use a smaller size IDFT matrix/operation, e.g., size 2×2 IDFT matrix, on the 2 received signals on the 2 REs to obtain x1 and x2.

In another example where data modifying component 352 can modify the data of size M to be of size K and/or can encode or modulate data symbols using M/K quadrature amplitude modulation (QAM) to achieve the reduced size data for input to the DFT, multiple repetitions of samples output from the DFT can be mapped to the one or more symbols. In this example, in mapping at least the portion of the set of REs at Block 506, optionally at Block 520, multiple repetitions of the set of REs can be mapped to the one or more symbols. In an aspect, mapping component 356, e.g., in conjunction with processor(s) 312, memory 316, transceiver 302, UE communicating component 342, etc., can map the multiple repetitions of the set of REs to the one or more symbols. This can enable a device receiving the waveform to decode the reduced size data. An example is shown in FIG. 7.

Figure 7:
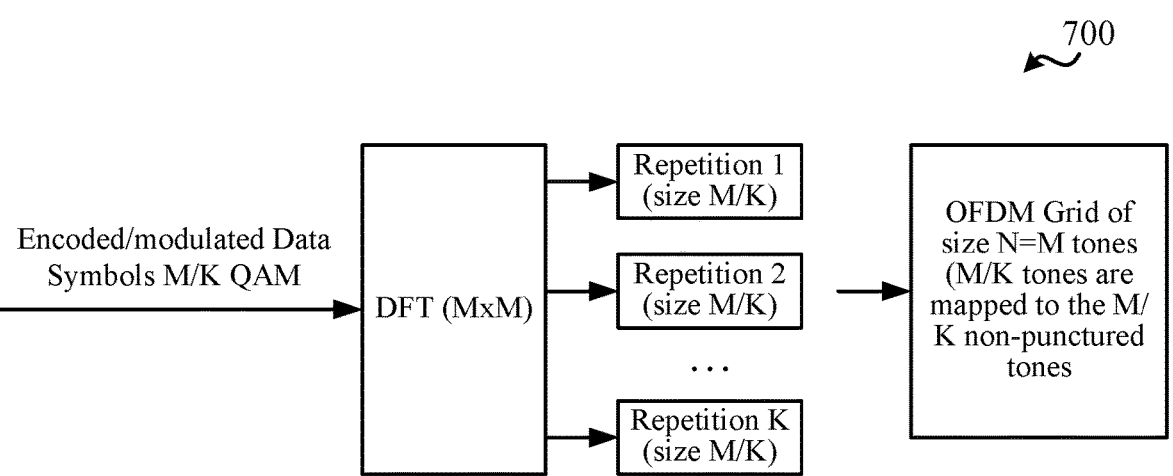
FIG. 7 illustrates an example of performing a DFT of a first size using reduced size data and mapping multiple repetitions of output from the DFT, in accordance with aspects described herein.

FIG. 7 illustrates an example of performing a DFT of a first size using reduced size data and mapping multiple repetitions of output from the DFT. In operation 700, encoded/modulated data symbols that are M/K QAM can be input into a DFT of size M×M. The DFT can output repetitions (e.g., repeated samples) of size M/K. One or more of the repetitions can be selected and mapped to a OFDM symbol grid or frequency sub-channels of size N=M tones/REs. For example, a repetition can be mapped to a symbol, resulting in M/K punctured tones, and the remaining tones can be punctured tones for receiving reference signals.

In another example, the data can be modified to be of a reduced size, and multiple repetitions of the data can be provided to the DFT. For example, in modifying the data at Block 502, optionally at Block 522, a size of the data can be reduced to be a size indicated for input to the DFT divided by a number of the one or more punctured REs. In an aspect, data modifying component 352, e.g., in conjunction with processor(s) 312, memory 316, transceiver 302, UE communicating component 342, etc., can reduce the size of the data to be the size indicated for input to the DFT divided by the number of the one or more punctured REs. By reducing the size in this regard, multiple repetitions of the reduced size data can be input into the DFT. For example, in performing the DFT at Block 504, optionally at Block 524, multiple repetitions of the reduced size data can be input to the DFT. In an aspect, DFT component 354, e.g., in conjunction with processor(s) 312, memory 316, transceiver 302, UE communicating component 342, etc., can input (or receive input of) multiple repetitions of the data of the reduced size input to the DFT, which can generate a comb-like signal having a number of non-punctured REs equal to the reduced data size. An example is shown in FIG. 8.

Figure 8:
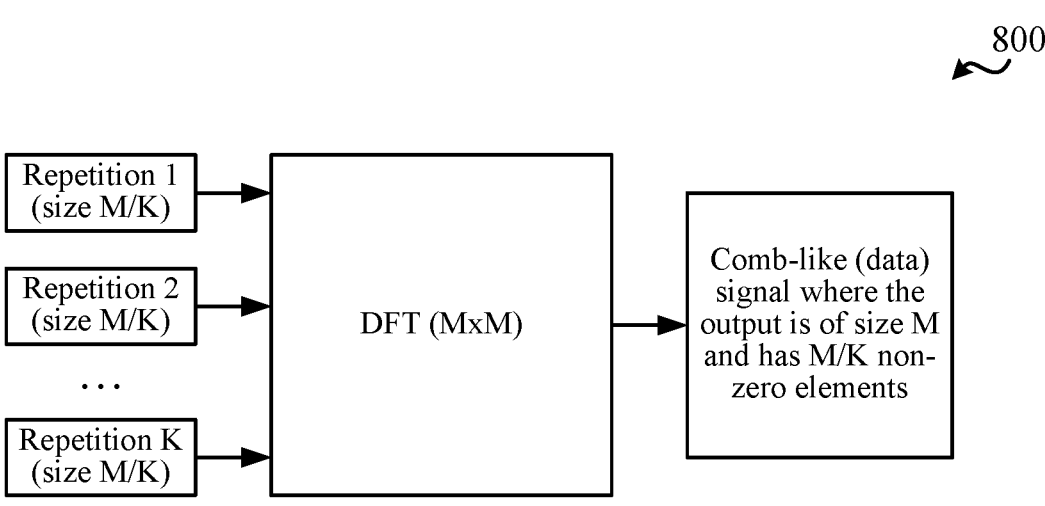
FIG. 8 illustrates an example of performing a DFT of a first size using multiple repetitions of reduced size data, in accordance with aspects described herein.

FIG. 8 illustrates an example of performing a DFT of a first size using multiple repetitions of reduced size data. In operation 800, encoded/modulated data symbols that are M/K QAM can be repeated, and the repetitions can be input into a DFT of size M×M. The DFT can output a comb-like data signal where the output can be of size M and can have M/K data tones, and the remaining tones can be the punctured tones.

In another example, a DFT size can be reduced to allow for leaving some REs as punctured REs. In method 500, optionally at Block 526, an input size (e.g., and thus output size) of the DFT can be reduced based on a number of the one or more punctured REs. In an aspect, DFT component 354, e.g., in conjunction with processor(s) 312, memory 316, transceiver 302, UE communicating component 342, etc., can reduce the input size of the DFT based on the number of the one or more punctured REs. In an example, the data modifying component 352 can also reduce the size of the data to match the input size of the DFT. For example, in modifying the data at Block 502, optionally at Block 528, a size of the data can be reduced to be the input side of the DFT as reduced. In an aspect, data modifying component 352, e.g., in conjunction with processor(s) 312, memory 316, transceiver 302, UE communicating component 342, etc., can reduce the size of the data to be the input size of the DFT as reduced. In this regard, the output of the DFT can be of the reduced size as well, such that mapping component 356 can map the samples to at least a portion of the set of REs, and the remaining REs can be punctured REs.

In this example, the DFT size can be equal to the size of the non-punctured symbols. For example, the DFT size can be M/K and can change based on K. In this example, the UE 104 (or base station 102 or other device generating the waveform) can include hardware, software, firmware capability to change the DFT size from M (of DFT block) to M/K=M−the number of DMRS REs.

Figure 9:
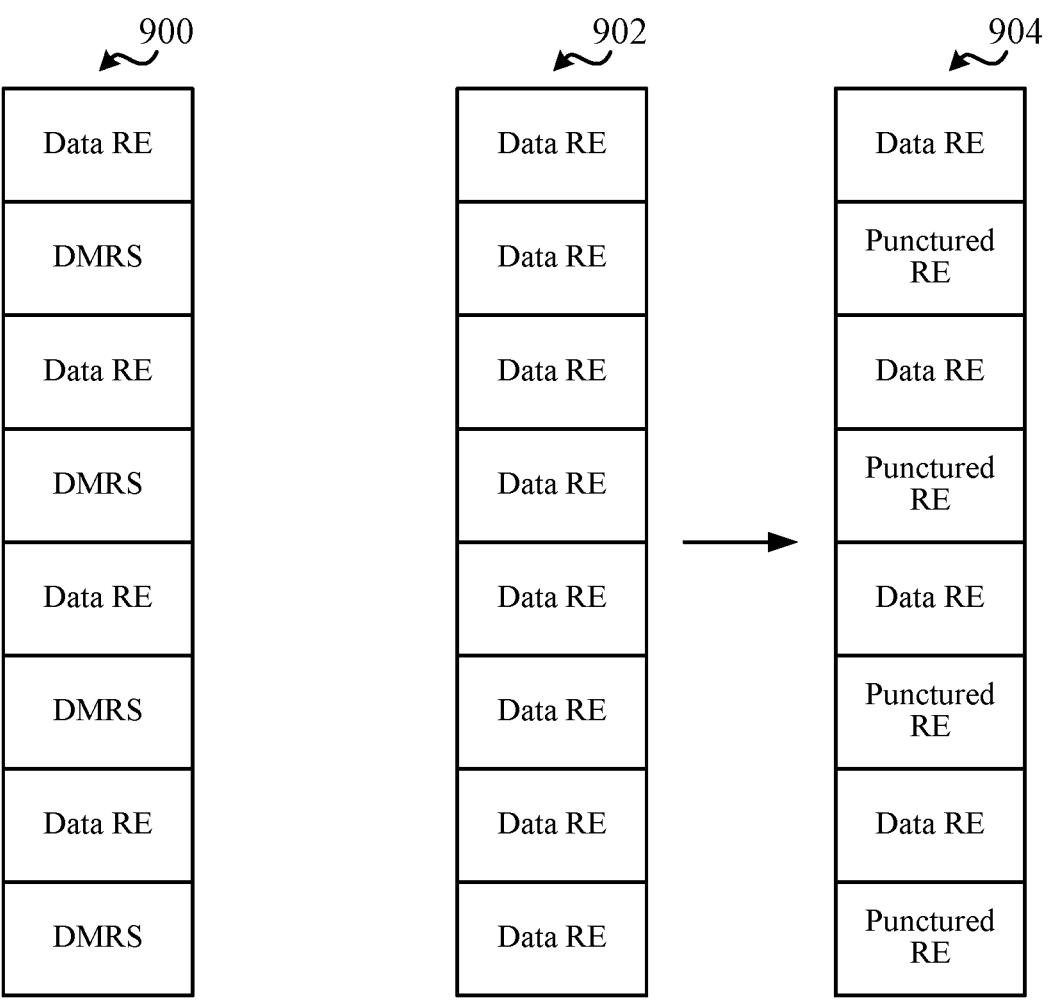
FIG. 9 illustrates an example of REs for transmitting in different communication directions, in accordance with aspects described herein.

FIG. 9 illustrates an example of REs for transmitting in different communication directions. REs 900 can be transmitted in a first communication direction (e.g., DL), and can include data REs interlaced with DMRS REs. Given the structure of the REs 900, a device transmitting signals in a second communication direction (e.g., UL) can puncture the REs corresponding to the DMRS REs. For example, given an input of data REs 902, the data REs 902 can be modified, as described above, before DFT so that the REs of the corresponding output signal for transmission can be REs 904, including data REs interleaved with punctured REs to allow for receiving the DMRS in full duplex communications. For example, where the set of REs 900 are DL REs, it can have 8 REs/tones, and be 8 QAM, which can result in 8 complex numbers (assuming a single layer per RE). In this example, the DL has 4 REs data and 4 REs DMRS: data, DMRS, data, DMRS, . . . , as shown. In UL, all data input to DFT can be QAM symbols/complex number, and 8 combination of data can be mapped to frequency domain/ REs. So, without puncturing, as described herein, the tones can include 8 tones/REs with 8 complex number. In one example, to generate a signal with puncturing for receiving the DMRS, the UL data can be reduced, from beginning with size N−the number of DMRS symbols, where N can be the total original allocation size (e.g., number of REs/sub-channels) used for data. For example, in the examples above, M/K=4; M>4. If M=8, then K−1=1, and data modifying component 352 can modify the data to 8 samples: symbol 1; 0; symbol 2; 0; symbol 3; 0; symbol 4; 0. In this example, the data can be modified to be 8-4=4 data QAMs for UL. DFT component 354 can then perform DFT of size M=4 (or higher), and mapping component 356 can then select 4 complex numbers and map them into the REs, while refraining from mapping on the other REs, such to puncture the other REs, as shown in REs 904.

FIG. 10 illustrates a flow chart of an example of a method 1000 for decoding data from a signal having one or more REs punctured for receiving reference signals, in accordance with aspects described herein. In an example, a base station 102 or UE 104 can perform the functions described in method 1000 using one or more of the components described in FIGS. 1 and 4.

In method 1000, at Block 1002, a signal can be received in a communication direction. In an aspect, BS communicating component 442, e.g., in conjunction with processor(s) 412, memory 416, transceiver 402, etc., can receive the signal in the communication direction. For example, the communication direction can be uplink where a base station 102 is receiving the signal, downlink where a UE 104 is receiving the signal, etc. In addition, the signal can have REs punctured for the device transmitting the signal to receive reference signals, as described.

In method 1000, optionally at Block 1004, the reference signals can be transmitted in a different communication direction while receiving the signal in the communication direction. In an aspect, BS communicating component 442, e.g., in conjunction with processor(s) 412, memory 416, transceiver 402, etc., can transmit, while receiving the signal in the communication direction, the reference signals in the different communication direction. For example, as described, BS communicating component 442 can transmit DL DMRS while receiving UL data in a full duplex mode, where BS communicating component 442 can transmit the DL DMRS in tones that are punctured in the UL data.

In method 1000, at Block 1006, at least a portion of a set of REs can be demapped from the signal, where the set of REs include one or more punctured REs corresponding to reference signals transmitted in a different communication direction. In an aspect, demapping component 452, e.g., in conjunction with processor(s) 412, memory 416, transceiver 402, BS communicating component 442, etc., can demap at least the portion of the set of REs from the signal, where the set of REs include one or more punctured REs corresponding to reference signals transmitted in a different communication direction. For example, demapping component 452 can demap at least the non-punctured REs from the signal for input into a IDFT.

In method 1000, at Block 1008, an IDFT can be performed on at least the portion of the set of REs to decode data. In an aspect, IDFT component 454, e.g., in conjunction with processor(s) 412, memory 416, transceiver 402, BS communicating component 442, etc., can perform the IDFT on at least the portion of the set of REs to decode data. For example, the IDFT can correspond to the DFT described above, and thus may be of size M×M or the output (and/or input) size may be reduced to account for punctured REs. In method 1000, optionally at Block 1010, an output size of the IDFT can be reduced based on a number of the one or more punctured REs. In an aspect, IDFT component 454, e.g., in conjunction with processor(s) 412, memory 416, transceiver 402, BS communicating component 442, etc., can reduce the output size of the IDFT based on the number of the one or more punctured REs. For example, IDFT component 454 can reduce the output size (and thus the input size) of the IDFT to allow for inputting a reduced number of REs (e.g., without puncture REs) to decode the reduced size data.

In another example, in demapping at least the portion of the set of REs at Block 1006, optionally at Block 1012, a number of REs equal to a size of the output of the IDFT divided by the number of zeros can be demapped. In an aspect, demapping component 452, e.g., in conjunction with processor(s) 412, memory 416, transceiver 402, BS communicating component 442, etc., can demap the number of REs equal to the size of the output of the IDFT divided by the number of zeros. For example, demapping component 452 can demap the non-punctured REs and not including the punctured REs corresponding to the number of zeros corresponding to punctured REs.

In another example, in demapping at least the portion of the set of REs at Block 1006, optionally at Block 1014, multiple repetitions of the number of REs can be demapped from the one or more symbols. In an aspect, demapping component 452, e.g., in conjunction with processor(s) 412, memory 416, transceiver 402, BS communicating component 442, etc., can demap the multiple repetitions of the number of REs from the one or more symbols. For example, demapping component 452 can demap one or more of repetitions that are mapped to the one or more symbols from the one or more symbols, where the repetitions can each include the data as a function of data elements input into the DFT, as described above.

In an example, demapping component 452 can provide the demapped REs or one or more of the repetitions as input to the IDFT to generate data. The data generated by the IDFT can include the decoded data and/or may include padded zeros, as described above. In an example, BS communicating component 442 can remove the padded zeros (e.g., between data samples or at the end of the data) to obtain the decoded data.

In another example, in performing the IDFT at Block 1008, optionally at Block 1016, multiple repetitions of the data of the reduced size can be output from the IDFT. In an aspect, IDFT component 454, e.g., in conjunction with processor(s) 412, memory 416, transceiver 402, BS communicating component 442, etc., can output, from the IDFT, multiple repetitions of the data of the reduced size. In an example, IDFT component 454 can decode the data based on one of the multiple repetitions.

Figure 11:
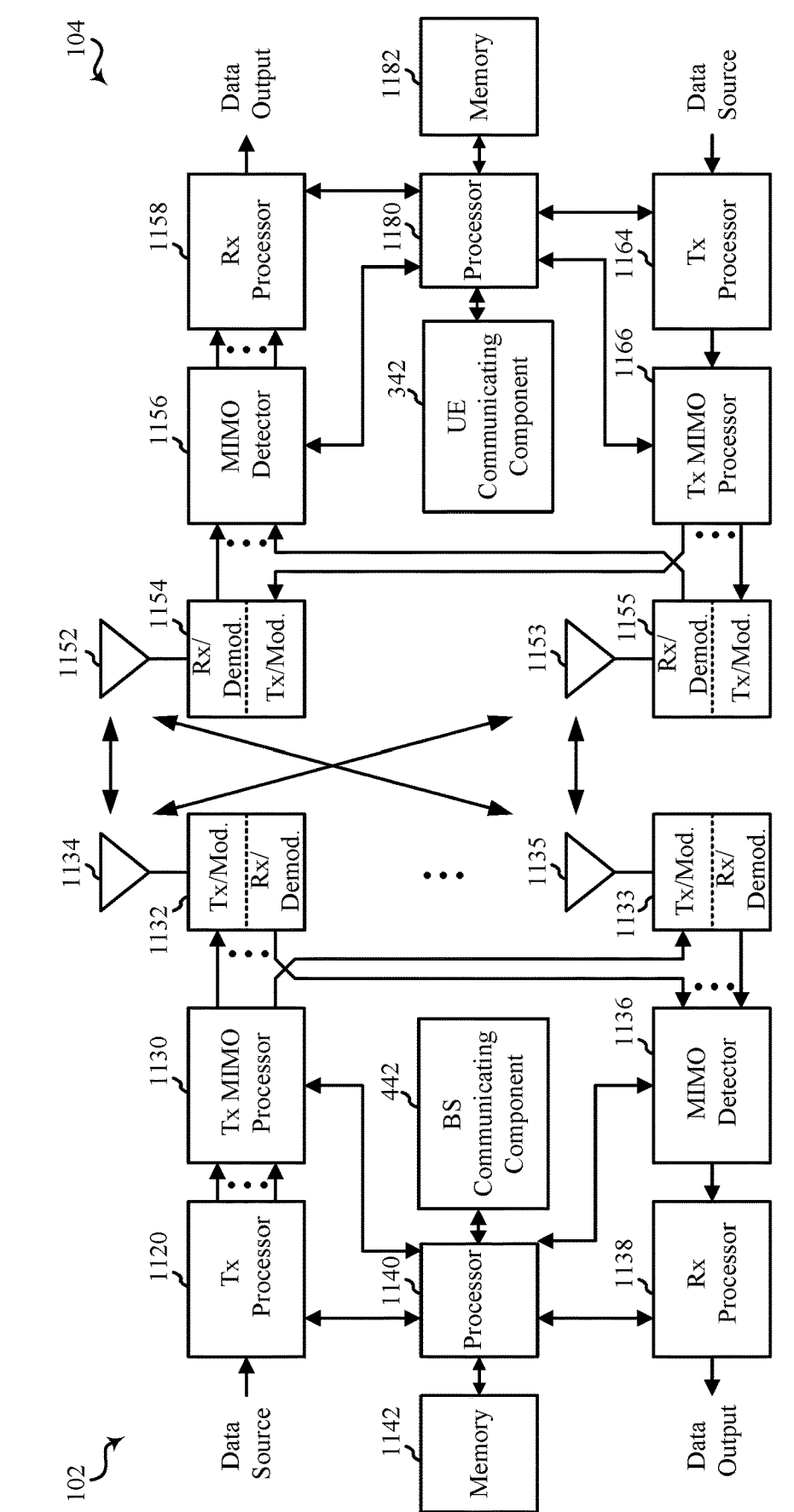
FIG. 11 is a block diagram illustrating an example of a multiple-input multiple-output (MIMO) communication system including a base station and a UE, in accordance with various aspects of the present disclosure.

FIG. 11 is a block diagram of a MIMO communication system 1100 including a base station 102 and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1 and 3. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor 1180, or memory 1182.

The processor 1180 may in some cases execute stored instructions to instantiate a UE communicating component 342 (see e.g., FIGS. 1 and 3).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for single carrier-FDMA, etc.), and be transmitted to the base station 102 in accordance with the communication parameters received from the base station 102. At the base station 102, the UL signals from the UE 104 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The processor 1140 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1100.

The following aspects are illustrative only and aspects thereof may be combined with aspects of other embodiments or teaching described herein, without limitation.

Aspect 1 is a method for wireless communication by a full duplex device including modifying data for input to a DFT so a set of REs output from the DFT for transmission in a communication direction includes one or more punctured REs corresponding to reference signals received in a different communication direction, performing the DFT for the data to generate the set of REs, mapping at least a portion of the set of REs to one or more symbols to generate a signal, and transmitting the signal in the communication direction.

In Aspect 2, the method of Aspect 1 includes receiving, while transmitting the signal in the communication direction, the reference signals in the different communication direction.

In Aspect 3, the method of Aspect 2 includes where the reference signals include a DMRS received from a second device, and performing, based on the DMRS, channel estimation of a channel received from the second device in non-punctured REs.

In Aspect 4, the method of any of Aspects 1 to 3 includes where modifying the data includes reducing a size of the data to be less than a size indicated for input to the DFT.

In Aspect 5, the method of any of Aspects 1 to 4 includes where modifying the data includes padding a number of zeros between samples as the input to the DFT to generate the one or more punctured REs, and where mapping at least the portion of the set of REs includes mapping a number of REs equal to a size of the input to the DFT divided by the number of zeros.

In Aspect 6, the method of Aspect 5 includes where mapping the number of REs includes mapping multiple repetitions of the number of REs to the one or more symbols to generate the signal.

In Aspect 7, the method of any of Aspects 1 to 6 includes where modifying the data includes reducing a size of the data to be a size indicated for input to the DFT divided by a number of the one or more punctured REs, and where performing the DFT includes inputting multiple repetitions of the data of the reduced size to the DFT.

In Aspect 8, the method of any of Aspects 1 to 7 includes reducing an input size of the DFT based on a number of the one or more punctured REs, and where modifying the data includes reducing a size of the data to be the input size of the DFT as reduced.

In Aspect 9, the method of any of Aspects 1 to 8 includes where modifying the data includes reducing a size of the data based on a number of the one or more punctured REs, and padding a second number of zeros to an end of the data, where the second number is equal to the number of the one or more punctured REs, and where mapping at least the portion of the set of the set of REs includes mapping a number of REs equal to a size of the input to the DFT divided by the second number.

In Aspect 10, the method of any of Aspects 1 to 9 includes where the full duplex device is one of a user equipment or a gNB that uses DFT-spread-orthogonal frequency division waveform to generate signals.

Aspect 11 is a method for wireless communication by a full duplex device includes receiving a signal in a communication direction, demapping at least a portion of a set of REs from the signal, where the set of REs include one or more punctured REs corresponding to reference signals transmitted in a different communication direction, and performing an IDFT on at least the portion of the set of REs to generate data.

In Aspect 12, the method of Aspect 11 includes transmitting, while receiving the signal in the communication direction, the reference signals in the different communication direction.

In Aspect 13, the method of Aspect 12 includes where the reference signals include a DMRS corresponding to a channel transmitted in non-punctured REs.

In Aspect 14, the method of any of Aspects 11 to 13 includes where the data is of a reduced size that is less than an output size of the IDFT.

In Aspect 15, the method of any of Aspects 11 to 14 includes where the data includes a number of padded zeros between samples equal to a number of the one or more punctured REs, and where demapping at least the portion of the set of the set of REs includes demapping a number of REs equal to a size of an output of the IDFT divided by the number of zeros.

In Aspect 16, the method of Aspect 15 includes where demapping the number of REs includes demapping multiple repetitions of the number of REs.

In Aspect 17, the method of any of Aspects 11 to 16 includes where the data is of a reduced size equal to an output size of the IDFT divided by a number of the one or more punctured REs, and where performing the IDFT includes outputting multiple repetitions of the data of the reduced size.

In Aspect 18, the method of any of Aspects 11 to 17 includes reducing an output size of the IDFT based on a number of the one or more punctured REs, and where the data is of a reduced size equal to the output size of the IDFT as reduced.

In Aspect 19, the method of any of Aspects 11 to 18 includes where the data is of a reduced size that is based on a number of the one or more punctured REs, including a second number of padded zeros at an end of the data, where the second number is equal to the number of the one or more punctured REs, and where demapping at least the portion of the set of the set of REs includes demapping a number of REs equal to a size of an output of the IDFT divided by the second number.

In Aspect 20, the method of any of Aspects 11 to 19 includes where the full duplex device is one of a user equipment or a gNB that uses DFT-spread-orthogonal frequency division waveform to process signals.

Aspect 21 is an apparatus for wireless communication including a processor, memory coupled with the processor, and instructions stored in the memory and operable, when executed by the processor, to cause the apparatus to perform any of the methods of Aspects 1 to 20.

Aspect 22 is an apparatus for wireless communication including means for performing any of the methods of Aspects 1 to 20.

Aspect 23 is a computer-readable medium including code executable by one or more processors for wireless communications, the code including code for performing any of the methods of Aspects 1 to 20.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a processor;
memory coupled with the processor; and
instructions stored in the memory and operable, when executed by the processor, to cause the apparatus to:
   modify data for input to a discrete Fourier transform (DFT) so a set of resource elements (REs) output from the DFT for transmission in a communication direction includes one or more punctured REs corresponding to reference signals received, by the apparatus and from another device, in a different communication direction;
   perform the DFT for the data to generate the set of REs;
   map at least a portion of the set of REs to one or more symbols to generate a signal; and
   transmit the signal in the communication direction.

2. The apparatus of claim 1, wherein the instructions, when executed by the processor, cause the apparatus to receive, while transmitting the signal in the communication direction, the reference signals in the different communication direction.

3. The apparatus of claim 2, wherein the reference signals include a demodulation reference signal (DMRS) received from a second device, and wherein the instructions, when executed by the processor, cause the apparatus to perform, based on the DMRS, channel estimation of a channel received from the second device in non-punctured REs.

4. The apparatus of claim 1, wherein the instructions, when executed by the processor, cause the apparatus to modify the data at least in part by reducing a size of the data to be less than a size indicated for input to the DFT.

5. The apparatus of claim 1, wherein the instructions, when executed by the processor, cause the apparatus to modify the data at least in part by padding a number of zeros between samples as the input to the DFT to generate the one or more punctured REs, and wherein the instructions, when executed by the processor, cause the apparatus to map at least the portion of the set of REs at least in part by mapping a number of REs equal to a size of the input to the DFT divided by the number of zeros.

6. The apparatus of claim 5, wherein the instructions, when executed by the processor, cause the apparatus to map the number of REs at least in part by mapping multiple repetitions of the number of REs to the one or more symbols to generate the signal.

7. The apparatus of claim 1, wherein the instructions, when executed by the processor, cause the apparatus to modify the data at least in part by reducing a size of the data to be a size indicated for input to the DFT divided by a number of the one or more punctured REs, and wherein the instructions, when executed by the processor, cause the apparatus to perform the DFT at least in part by inputting multiple repetitions of the data of the reduced size to the DFT.

8. The apparatus of claim 1, wherein the instructions, when executed by the processor, cause the apparatus to reduce an input size of the DFT based on a number of the one or more punctured REs, and wherein the instructions, when executed by the processor, cause the apparatus to modify the data at least in part by reducing a size of the data to be the input size of the DFT as reduced.

9. The apparatus of claim 1, wherein the instructions, when executed by the processor, cause the apparatus to modify the data at least in part by reducing a size of the data based on a number of the one or more punctured REs, and padding a second number of zeros to an end of the data, wherein the second number is equal to the number of the one or more punctured REs, and wherein the instructions, when executed by the processor, cause the apparatus to map at least the portion of the set of the set of REs at least in part by mapping a number of REs equal to a size of the input to the DFT divided by the second number.

10. The apparatus of claim 1, wherein the apparatus is one of a user equipment or a gNB that uses DFT-spread-orthogonal frequency division waveform to generate signals.

11. An apparatus for wireless communication, comprising:

a processor;

memory coupled with the processor; and instructions stored in the memory and operable, when executed by the processor, to cause the apparatus to:

receive a signal from a first device in a communication direction;

demap at least a portion of a set of resource elements (REs) from the signal, wherein the set of REs include one or more punctured REs corresponding to reference signals transmitted by a different device than the first device in a different communication direction; and perform an inverse discrete Fourier transform (IDFT) on at least the portion of the set of REs to generate data.

12. The apparatus of claim 11, wherein the instructions, when executed by the processor, cause the apparatus to transmit, while receiving the signal in the communication direction, the reference signals in the different communication direction.

13. The apparatus of claim 12, wherein the reference signals include a demodulation reference signal (DMRS) corresponding to a channel transmitted in non-punctured REs.

14. The apparatus of claim 11, wherein the data is of a reduced size that is less than an output size of the IDFT.

15. The apparatus of claim 11, wherein the data includes a number of padded zeros between samples equal to a number of the one or more punctured REs, and wherein the instructions, when executed by the processor, cause the apparatus to demap at least the portion of the set of the set of REs at least in part by demapping a number of RES equal to a size of an output of the IDFT divided by the number of zeros.

16. The apparatus of claim 15, wherein the instructions, when executed by the processor, cause the apparatus to demap the number of REs at least in part by demapping multiple repetitions of the number of REs.

17. The apparatus of claim 11, wherein the data is of a reduced size equal to an output size of the IDFT divided by a number of the one or more punctured REs, and wherein the instructions, when executed by the processor, cause the apparatus to perform the IDFT at least in part by outputting multiple repetitions of the data of the reduced size.

18. The apparatus of claim 11, wherein the instructions, when executed by the processor, cause the apparatus to reduce an output size of the IDFT based on a number of the one or more punctured REs, and wherein the data is of a reduced size equal to the output size of the IDFT as reduced.

19. The apparatus of claim 11, wherein the data is of a reduced size that is based on a number of the one or more punctured REs, including a second number of padded zeros at an end of the data, wherein the second number is equal to the number of the one or more punctured REs, and wherein the instructions, when executed by the processor, cause the apparatus to demap at least the portion of the set of the set of REs at least in part by demapping a number of REs equal to a size of an output of the IDFT divided by the second number.

20. The apparatus of claim 11, wherein the apparatus is one of a user equipment or a gNB that uses DFT-spread-orthogonal frequency division waveform to process signals.

21. A method for wireless communication by a full duplex device, comprising:

modifying data for input to a discrete Fourier transform (DFT) so a set of resource elements (REs) output from the DFT for transmission in a communication direction includes one or more punctured REs corresponding to reference signals received, by the full duplex and from another device, in a different communication direction;

performing the DFT for the data to generate the set of RES;

mapping at least a portion of the set of REs to one or more symbols to generate a signal; and transmitting the signal in the communication direction.

22. The method of claim 21, further comprising receiving, while transmitting the signal in the communication direction, the reference signals in the different communication direction.

23. The method of claim 22, wherein the reference signals include a demodulation reference signal (DMRS) received from a second device, and further comprising performing, based on the DMRS, channel estimation of a channel received from the second device in non-punctured REs.

24. The method of claim 21, wherein modifying the data includes reducing a size of the data to be less than a size indicated for input to the DFT.

25. The method of claim 21, wherein modifying the data includes padding a number of zeros between samples as the input to the DFT to generate the one or more punctured REs, and wherein mapping at least the portion of the set of REs includes mapping a number of REs equal to a size of the input to the DFT divided by the number of zeros.

26. A method for wireless communication by a full duplex device, comprising:

receiving a signal from a first device in a communication direction;

demapping at least a portion of a set of resource elements (REs) from the signal, wherein the set of REs include one or more punctured REs corresponding to reference signals transmitted by a different device than the first device in a different communication direction; and performing an inverse discrete Fourier transform (IDFT) on at least the portion of the set of REs to generate data.

27. The method of claim 26, further comprising transmitting, while receiving the signal in the communication direction, the reference signals in the different communication direction.

28. The method of claim 27, wherein the reference signals include a demodulation reference signal (DMRS) corresponding to a channel transmitted in non-punctured REs.

29. The method of claim 26, wherein the data is of a reduced size that is less than an output size of the IDFT.

30. The method of claim 26, wherein the data includes a number of padded zeros between samples equal to a number of the one or more punctured REs, and wherein demapping at least the portion of the set of the set of REs includes demapping a number of REs equal to a size of an output of the IDFT divided by the number of zeros.

\* \* \* \* \*